US008243059B2

(12) United States Patent
Lai et al.

(10) Patent No.: US 8,243,059 B2
(45) Date of Patent: Aug. 14, 2012

(54) DRIVING METHOD FOR A DISPLAY

(75) Inventors: Chih-Chang Lai, Tai Chung County (TW); Lin Lin, Tai Chung (TW); Wen Hung Wang, Tai Chung (TW)

(73) Assignee: Wintek Corporation, Taichung (TW)

( * ) Notice: Subject to any disclaimer, the term of this patent is extended or adjusted under 35 U.S.C. 154(b) by 700 days.

(21) Appl. No.: 12/390,227

(22) Filed: Feb. 20, 2009

(65) Prior Publication Data

US 2009/0213109 A1 Aug. 27, 2009

Related U.S. Application Data

(60) Provisional application No. 61/030,726, filed on Feb. 22, 2008.

(51) Int. Cl.
*G06F 3/038* (2006.01)

(52) U.S. Cl. ............ 345/214; 345/96; 345/99; 345/100; 345/52

(58) Field of Classification Search ........................ None
See application file for complete search history.

(56) References Cited

U.S. PATENT DOCUMENTS

2005/0190128 A1* 9/2005 Hayafuji ......................... 345/76
2007/0229432 A1* 10/2007 Kimura ........................... 345/96

* cited by examiner

*Primary Examiner* — Muhammad N Edun
(74) *Attorney, Agent, or Firm* — Muncy, Geissler, Olds & Lowe, PLLC

(57) ABSTRACT

The invention discloses a driving method for a display. The method includes the following steps: providing a pixels structure; receiving a plurality of frames; driving the (2n−1)th scan line and the (2n)th scan line by turns while receiving the number of odd frame; driving (2n)th scan line and (2n−1)th scan line by turns while receiving the number of even frame; adjusting the voltage of the Vcom according to pixels voltage value which are the voltage to be written into the pixels by odd data lines and even data lines while the pixels structure receiving the number of odd frame and the number of the even frame.

22 Claims, 18 Drawing Sheets

DRIVING METHOD FOR A DISPLAY

CROSS REFERENCE TO RELATED APPLICATIONS

This application claims priority of U.S. Provisional Application No. 61/030,726 filed on Feb. 22, 2008 under 35 U.S.C. §119(e), the entire contents of which are hereby incorporated by reference.

BACKGROUND OF THE INVENTION (a) Field of the Invention

The invention relates to a driving method, particularly to a driving for a display.

(b) Description of the Related Art

FIG. 1A shows a schematic diagram illustrating the circuit layout of a general panel. The circuit layout of the panel comprises a plurality of pixel circuits. FIG. 1B shows the waveforms of the driving signals in FIG. 1A. As shown in FIG. 1A, the driving method of the driving signals is row inversion driving and the dot inversion effect will appear due to the circuit layout. During scanning every time, the scan signal G(n) couples to the adjacent pixel (near the pixel of G(n)) of the previous scan signal G(n−1) and it causes the effective voltage written into the adjacent pixel to decrease. Due to the panel layout, this adjacent pixel shows the result of the affected odd-th or even-th data lines in the vertical direction and thus the image frame displayed by the panel becomes non-uniform.

FIG. 2 shows a schematic diagram illustrating the circuit layout of another panel. The driving signals shown in FIG. 1B can be used to operate this panel. As shown in FIG. 2, the data lines of the same row perform writing twice and the data voltage of the first writing will be affected by data coupling with the second writing, and the second writing will not be affected. Thus, the written voltages for the odd-th data lines and the even-th data lines in the panel are inconsistent to cause the image frame displayed by the panel to become non-uniform.

BRIEF SUMMARY OF THE INVENTION

In light of the above-mentioned problem, one object of the invention is to provide a driving method for a display to prevent the above mentioned non-uniform phenomenon.

One embodiment of the invention provides a driving method for a display, comprising the following steps. At first, a pixel structure is provided. The pixel structure comprises a plurality of scan lines, a plurality of data lines, and a plurality of pixels. Then, a plurality of frames are received. The (2n−1)th scan line and the (2n)th scan line are alternately driven while the odd-th frame is received wherein n is a positive integer and less than infinity. The (2n)th scan line and the (2n−1)th scan line are alternately driven while the even-th frame is received. The voltage of the common electrode Vcom is adjusted according to the voltage values which are to be written into the pixels separately by odd data lines and even data lines while the pixel structure receives the odd-th frame and the even-th frame.

Another embodiment of the invention provides a driving method for a display. The method comprises the following steps. At first, a pixel structure is provided. The pixel structure comprises a plurality of scan lines, a plurality of data lines, and a plurality of pixels. Then, a plurality of frames are received wherein the time period of everyone of the frames is divided into a first duration and a second duration. While receiving one frame, the odd-th scan lines are driven during the first duration and the even-th scan lines are driven during the second duration. Following that, the voltage of the common electrode Vcom is adjusted according to the voltage values affected separately by odd data lines and even data lines while the pixel structure receives the odd-th frame and the even-th frame.

Furthermore, another embodiment of the invention provides a driving method for a display. The method comprises the following steps. At first, a pixel structure is provided. The pixel structure comprises a plurality of scan lines, a plurality of data lines, and a plurality of pixels. Then, the pixel structure is examined and the pixels that are affected while each data line writes data and each scan line scans are discovered to thereby acquire the voltage errors of the affected pixels. The voltage magnitude of the corresponding data line is adjusted according to the voltage errors of the affected pixels. Then, a plurality of frames are received. The scan lines and the data lines are driven according to preset order.

The driving method for a display according to the embodiments of the invention properly drives the pixels of different positions at different time points to have the pixels receive the proper driving voltage to achieve the purpose of enhancing display quality.

DETAILED DESCRIPTION OF THE INVENTION

The driving method for a display according to the invention will be described in details with reference to the drawings.

Figure 3A:
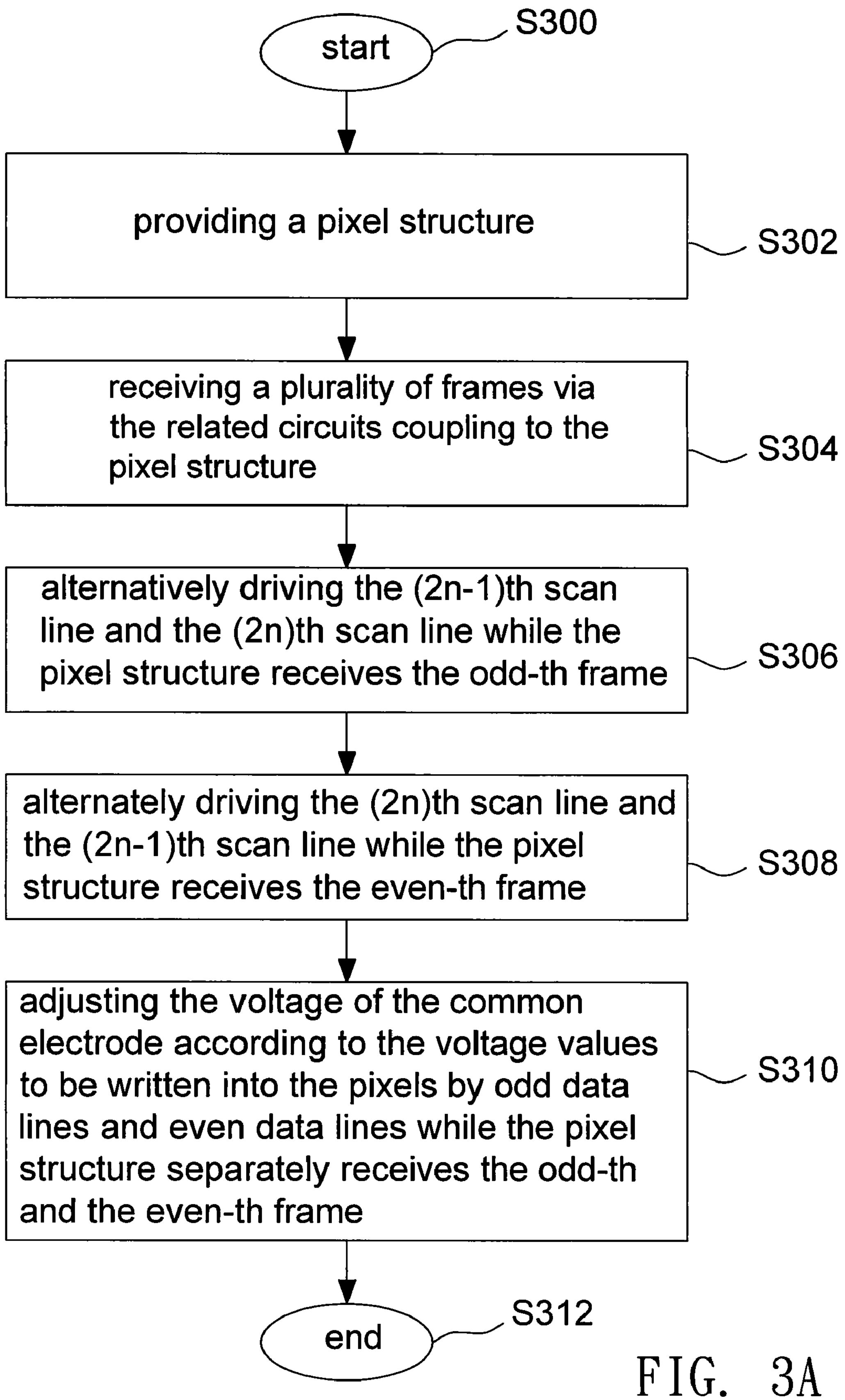
FIG. 3A shows a flow chart diagram illustrating the driving method for a display according to one embodiment of the invention.
Figure 3B:
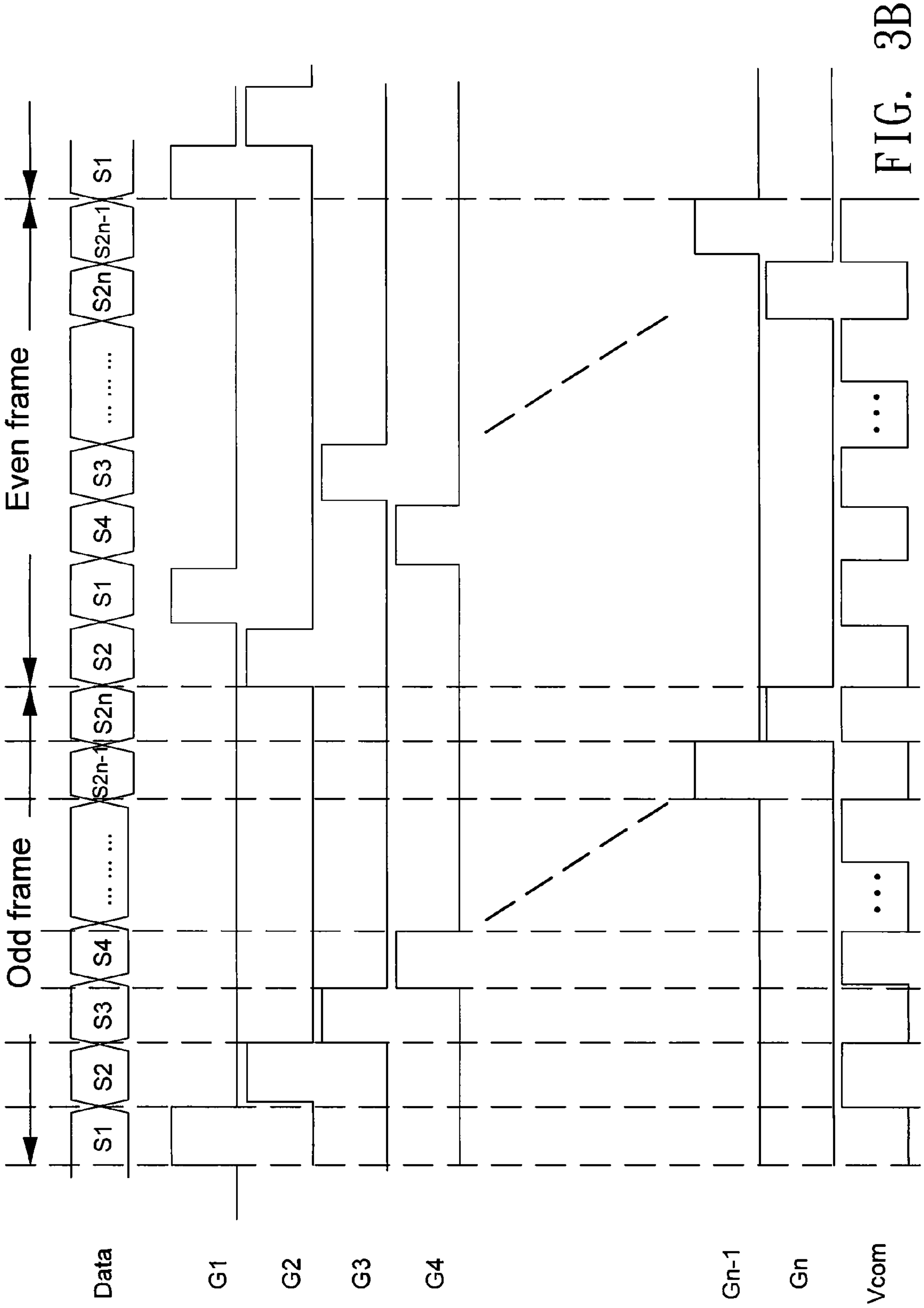
FIG. 3B shows the waveforms for driving the pixel structure shown in FIG. 3A.

FIG. 3A shows a flow chart diagram illustrating the driving method for a display according to one embodiment of the invention. FIG. 3B shows the waveforms for driving the pixel structure shown in FIG. 3A. The examples of the pixel structure applicable to the method according to the invention are shown in FIG. 3C and FIG. 3D.

Figure 3C:
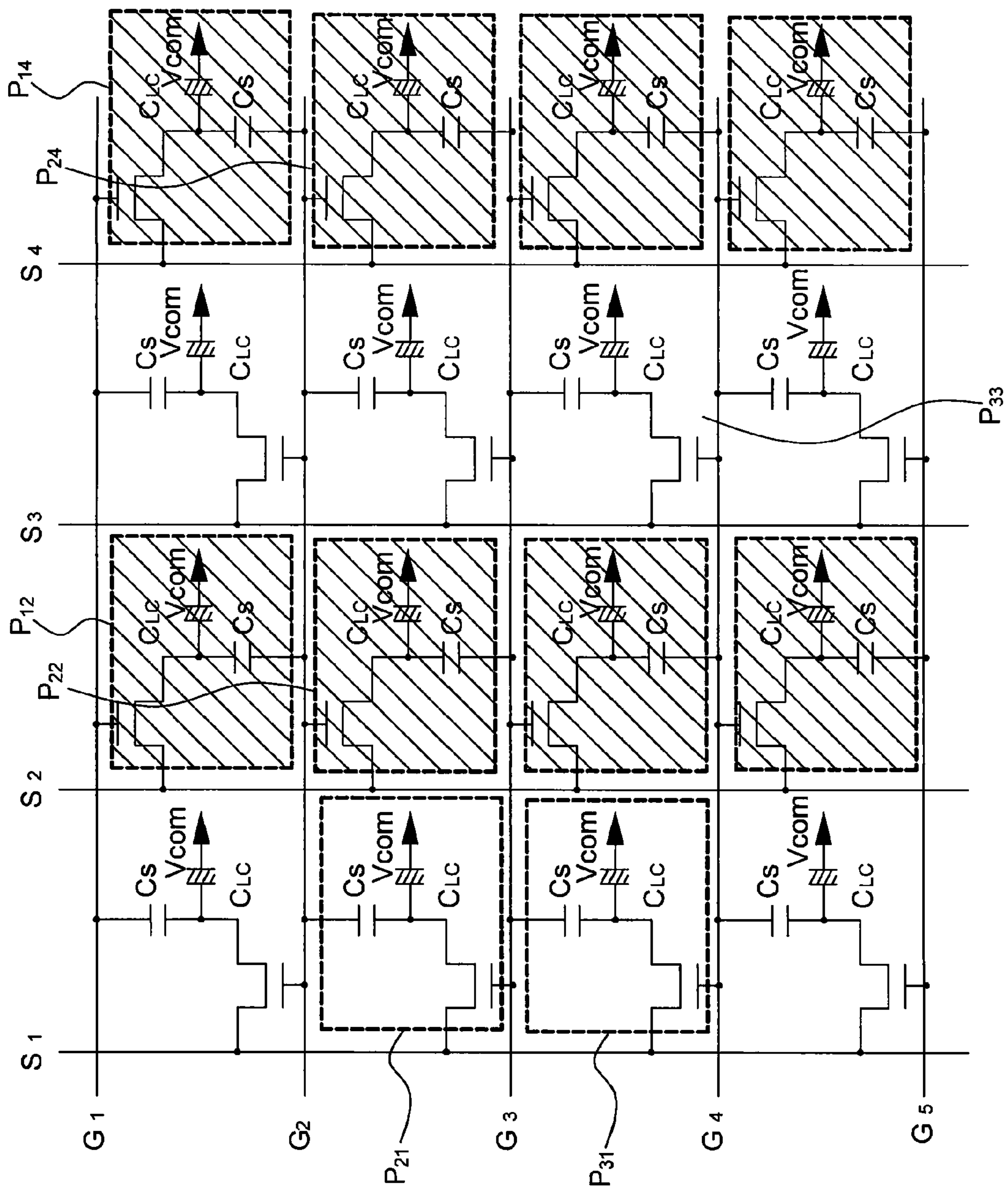
FIG. 3C shows one operational schematic diagram of the driving method shown in FIG. 3A.
Figure 3D:
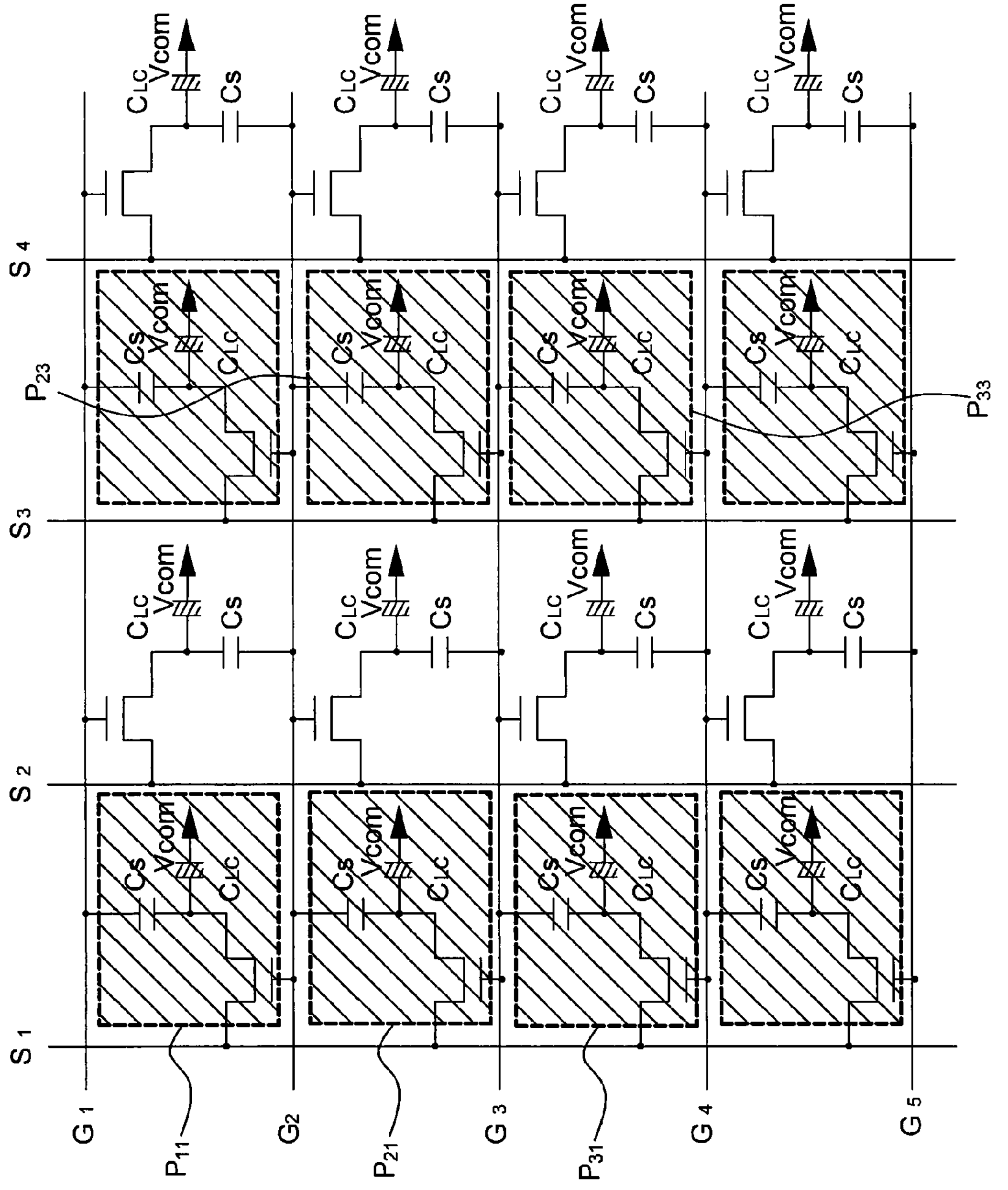
FIG. 3D shows another operational schematic diagram of the driving method shown in FIG. 3A.

As shown in FIG. 3A, the driving method for a display comprises the following steps:

Step S300: start;

Step S302: at first, providing a pixel structure as shown in FIGS. 3C and 3D where the pixel structure comprises a plurality of scan lines, a plurality of data lines, and a plurality of pixels;

(It should be noted that in the pixel structure shown in FIGS. 3C and 3D the gate electrodes of every two adjacent pixels couple to different scan lines. For example, the gate electrode of the pixel P21 connects to the scan line G3 while the gate electrode of the adjacent pixel P22 thereof connects to the scan line G2 or the gate electrode of the pixel P31 adjacent to the pixel P21 connects to the scan line G4. The related circuits connecting to the pixel structure should be understood by those who are skilled in the art and will not be described in details hereinafter.)

Step S304: receiving a plurality of frames via the related circuits coupling to the pixel structure;

Step S306: alternately driving the (2n−1)th scan line and the (2n)th scan line while the pixel structure receives the odd-th frame where n is a positive integer and less than infinity; (It should be noted that the start scan line is the first scan line shown in FIGS. 3C and 3D. Obviously, numbering the scan lines is not limited and can be adjusted accordingly. For example, the start scan line can be the zero-th scan line.) In other words, the $1^{st}$ scan line is driven first and the $2^{nd}$ scan line is driven later during the odd-th frame . . . etc.

Step S308: alternately driving the (2n)th scan line and the (2n−1)th scan line while the pixel structure receives the even-th frame; In other words, the $2^{nd}$ scan line is driven first and the $1^{st}$ scan line is driven later during the even-th frame . . . etc.

Step S310: adjusting the voltage of the common electrode (Vcom) according to the voltage values to be written into the pixels by odd data lines and even data lines while the pixel structure separately receives the odd-th frame and the even-th frame; and Step S312: End.

The following example will describe the driving method for a display in details, with reference to FIGS. 3A~3D. It is assumed that the frame of the display is set to have a 2.5 Volt (denoted as "V" hereinafter) voltage difference by the designer, that is, the voltage for writing data by each data line S1~Sn is set to 2.5V.

When the pixel structure receives the odd-th frame, as shown in FIG. 3B, the driving method according to one embodiment of the invention sequentially drives the scan lines G1, G2, G3, G4, . . . , Gn−1, Gn. Thus, in FIG. 3C, each pixel of the even-th data line S(2n) will be affected by coupling with the next scan line. For example, after the pixels P12 and P14 of the data lines S2 and S4 operate together with the data lines while the scan line G1 scans, the pixels P12 and P14 are stored with voltage values. After that, when the scan line G2 scans, the pixels P22 and P24 are driven but the pixels P12 and P14 are correlated with the pixels P22 and P24 since the gate electrodes of the pixels P22 and P24 connect to the capacitors Cs of the pixels P12 and P14, respectively. That is, when the scanning voltages of the pixels P22 and P24 vary, the pixels P12 and P14 will be affected. In one embodiment, when the scanning voltages (voltage of G2) of the pixels P22 and P24 vary, for example, from the high level +15V dropped to −10V, the coupling voltage $\Delta V=(15-(-10))*Ccp/Ctl=25*0.005\ pF/0.5\ pF=0.25V$ (assuming the coupling capacitance Ccp=0.005 pF and total capacitance Ctl=0.5 pF) is generated between the pixels P22 and P24 and the pixels P12 and P14. Therefore, the actual voltage written into the pixels P12 and the P14 becomes 2.5−0.25V=2.25V. The rest may be deduced by analogy. The actual voltage written into the pixels by the even-th data lines S2, S4, S4, and so forth becomes 2.5−0.25V=2.25V. In other words, the actual voltage written into pixels by each even-th data line S(2n) decreases from 2.5V to 2.25V. At the time, the odd-th data line S(2n+1) will not be affected and the actual voltage written into pixels is still 2.5V, as shown by the pixels with hatched lines in FIG. 3C.

Then, when the pixel structure receives the even-th frame, as shown in FIG. 3A, the driving method according to one embodiment of the invention alternately drives the (2n)th scan line and the (2n−1)th scan line, for example driving by order of G2, G1, G4, G3, . . . , Gn, Gn−1. In such a way, in FIG. 3D, every pixel of the odd-th data line S(2n+1) will be affected by the next scan line. For example, after the pixels P31 and P33 of the odd-th data lines S1 and S3 operate together with the data lines while the scan line G4 scans, the pixels P31 and P33 are stored with voltage values. After that, when the scan line G3 scans, the pixels P21 and P23 are driven but the pixels P31 and P33 are correlated with the pixels P21 and P23 since the gate electrodes of the pixels P21 and P23 connect to the capacitors Cs of the pixels P31 and P33, respectively. That is, when the scanning voltages of the pixels P21 and P23 vary, the pixels P31 and P33 will be affected. In one embodiment, when the scanning voltages (voltage of G3) of the pixels P21 and P23 vary, for example, from the high level +15V dropped to −10V, the coupling voltage $\Delta V=(15-(-10))*Ccp/Ctl=25*0.005\ pF/0.5\ pF=0.25V$ (assuming the coupling capacitance Ccp=0.005 pF and total capacitance Ctl=0.5 pF) is generated between the pixels P21 and P23 and the pixels P31 and P33. Therefore, the actual voltage written into the pixels P31 and the P33 becomes 2.5−0.25V=2.25V. The rest may be deduced by analogy. The actual voltage written into the pixels by the odd-th data lines S1, S3, S5, . . . becomes 2.5−0.25V=2.25V. In other words, the actual voltage written into pixels by each odd-th data line S(2n+1) decreases from 2.5V to 2.25V. At the time, the even-th data line S(2n) will not be affected and the actual voltage written into pixels is still 2.5V, as shown by the pixels with hatched lines in FIG. 3D.

Thus, the visual integrated effect shown by the pixel structure is the voltage difference (2.5+2.25)/2=2.375V written by the odd-th data line S(2n+1) and the voltage difference (2.5+2.25)/2=2.375V written by the even-th data line S(2n). At the time, as long as the voltage of the common electrode Vcom is adjusted to be decreased by 0.125V, the whole frame can have a 2.5V voltage difference and thereby the voltages written by the odd-th data lines and written by the even-th data lines will not cause any visual difference. Therefore, the problem due to the characteristics of the pixel structure in the prior art resulting in the non-uniform frame displayed by the display panel is solved.

| Odd-the frame | | Even-th frame | |
|---|---|---|---|
| S(2n) | S(2n + 1) | S(2n) | S(2n + 1) |
| 2.25 V | 2.5 V | 2.5 V | 2.25 V |

Figure 4A:
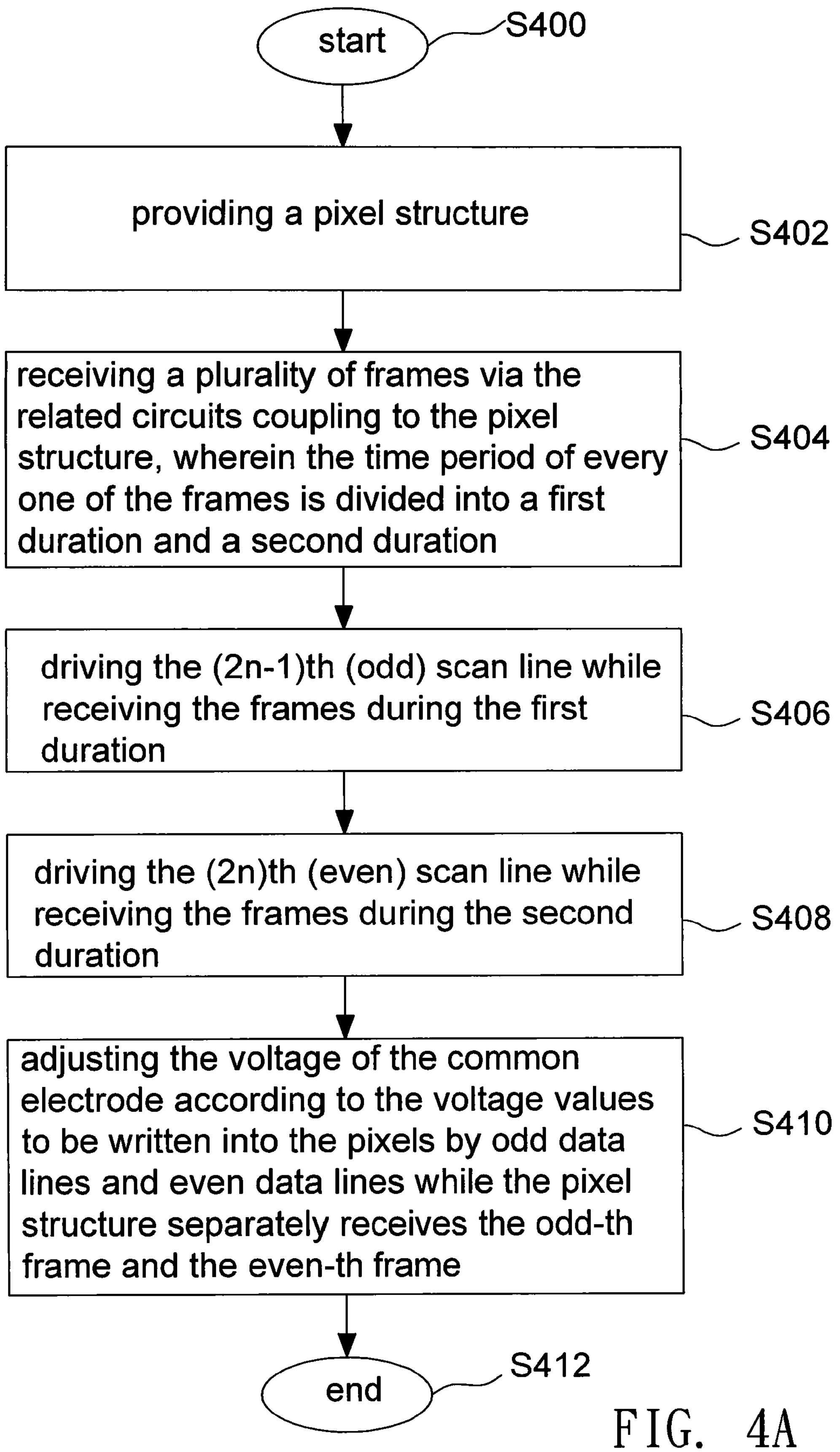
FIG. 4A shows a flow chart diagram illustrating the driving method for a display according to another embodiment of the invention.
Figure 4B:
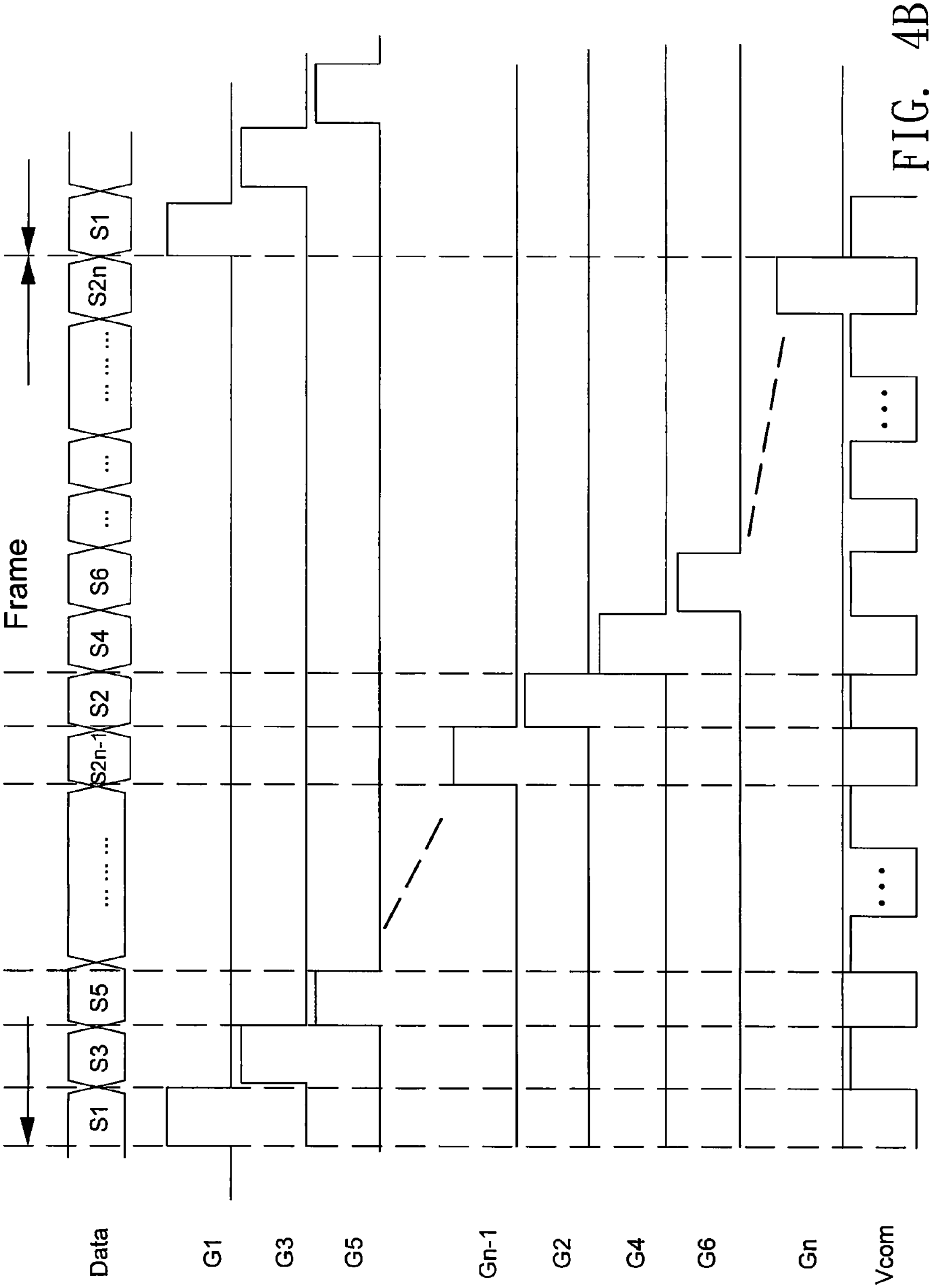
FIG. 4B shows the waveforms for driving the pixel structure shown in FIG. 4A.
Figure 4C:
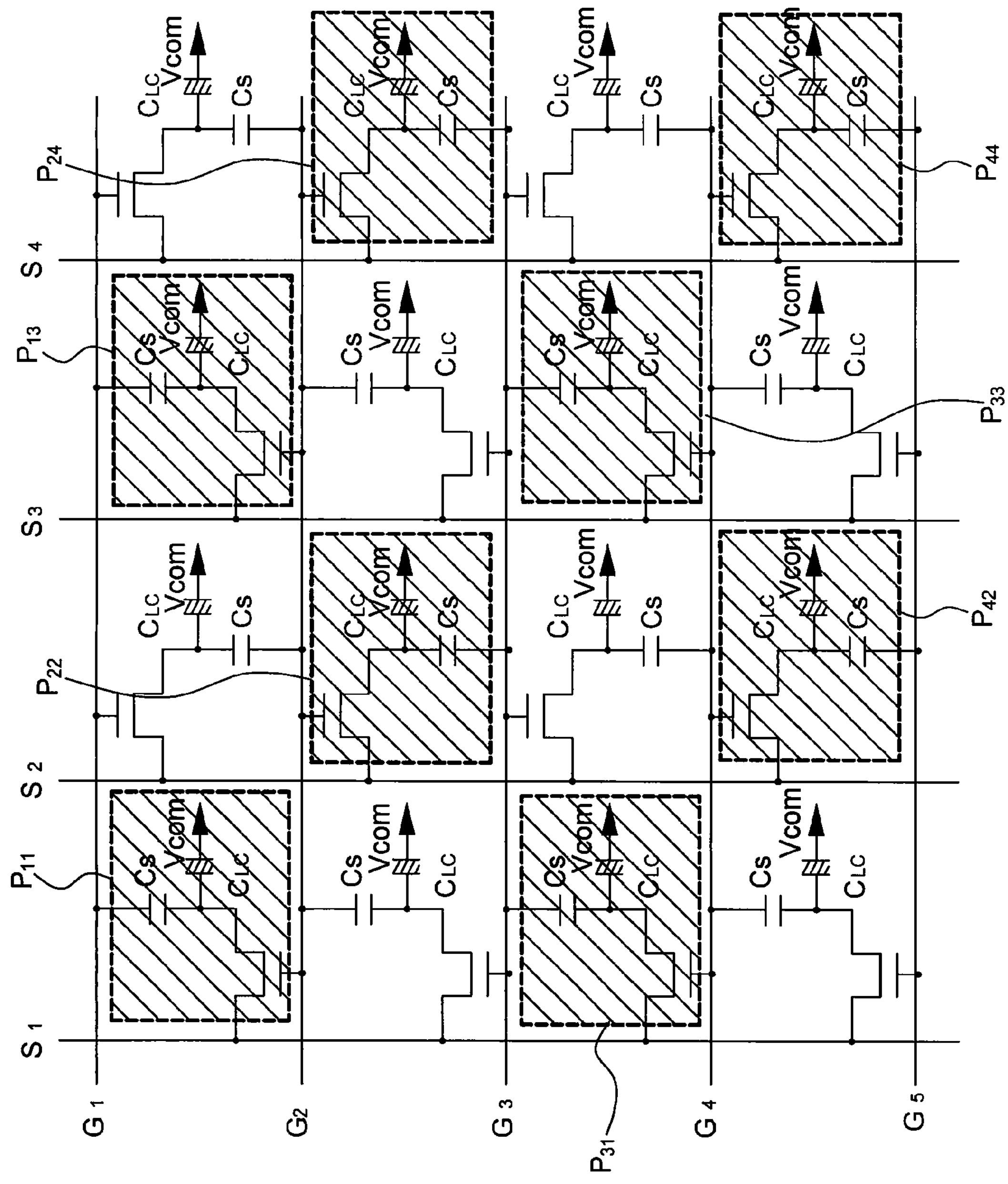
FIG. 4C shows one operational schematic diagram of the driving method shown in FIG. 4A.
Figure 4D:
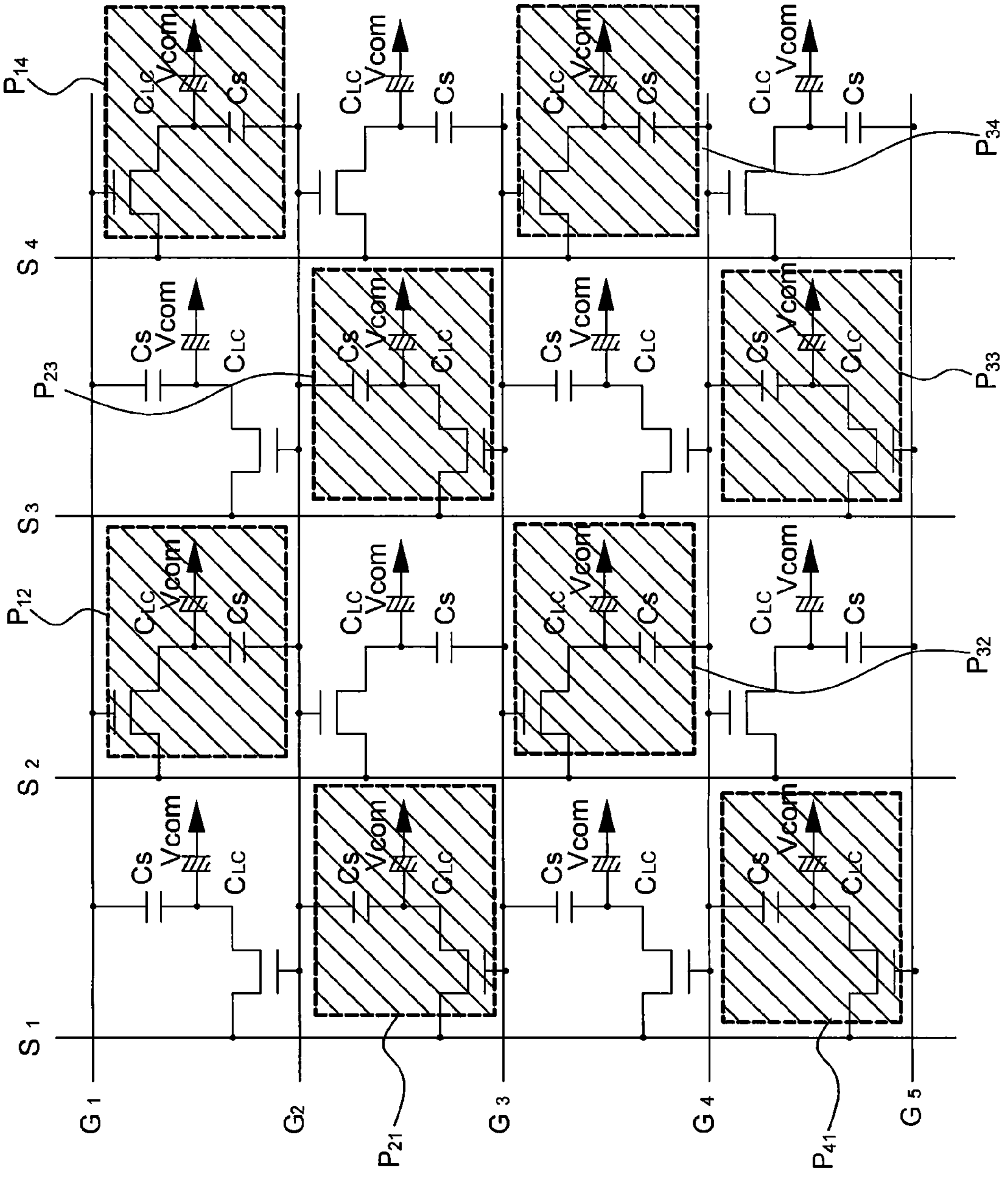
FIG. 4D shows another operational schematic diagram of the driving method shown in FIG. 4A.

FIG. 4A shows a flow chart diagram illustrating the driving method for a display according to another embodiment of the invention. FIG. 4B shows the waveforms for driving the pixel structure shown in FIG. 4A. The examples of the pixel structure applicable to the method according to the invention are shown in FIG. 4C and FIG. 4D. The pixel structure of FIGS. 4C and 4D is the same as that of FIGS. 3C and 3D and will not be described in details hereafter.

As shown in FIG. 4A, the driving method for a display comprises the following steps:

Step S400: start;

Step S402: providing a pixel structure as shown in FIGS. 4C and 4D where the pixel structure comprises a plurality of scan lines, a plurality of data lines, and a plurality of pixels and the gate electrodes of the adjacent pixels couple to different scan lines;

Step S404: receiving a plurality of frames via the related circuits coupling to the pixel structure, wherein the time period of every one of the frames is divided into a first duration and a second duration;

Step S406: driving the (2n−1)th (odd) scan line while receiving the frames during the first duration where n is a positive integer and less than infinity and the (2n−1)th scan line can be driven in preset order (for example, sequentially driving G1, G3, G5, . . . , till G2n−1, driving the scan lines by having n increased progressively from a preset value to a value less than infinity, or driving the scan lines by having n decreased progressively from a preset value to 0);

Step S408: driving the (2n)th (even) scan line while receiving the frames during the second duration where the (2n)th even scan line can be driven in preset order (for example, sequentially driving G2, G4, G6, . . . , till G2n, driving the scan lines by having n increased progressively from a preset value to a value less than infinity, or driving the scan lines by having n decreased progressively from a preset value to 0);

Step S410: adjusting the voltage of the common electrode (Vcom) according to the voltage values to be written into the pixels by odd data lines and even data lines while the pixel structure separately receives the odd-th frame and the even-th frame; and Step S412: End.

The following example will describe the driving method for a display in details, with reference to FIGS. 4A~4D. It is assumed that the frame of the display is set to have a 2.5V voltage difference by the designer, that is, the voltage for writing data by each data line S1~Sn is set to 2.5V.

When the pixel structure receives the frames, as shown in FIG. 4B, the driving method according to one embodiment of the invention sequentially drives the scan lines G1, G3, G5, . . . , G2n−1. Thus, each pixel of the odd-th data line S(2n−1) and the even-th data line S(2n) will be affected by coupling with the next scan line. For example, in FIG. 4C, when the scan lines G1, G3, G5 are driven sequentially, the pixels P11, P13, P31, and P33 of the odd-th data lines S1 and S3 will be affected and the pixels P22, P24, P42, and P44 of the even-th data lines S2 and S4 will also be affected. In one embodiment, when the scanning voltages (voltages of G1, G3, G5, . . . ) vary, for example, from the high level +15V dropped to −10V, the coupling voltage ΔV=(15−(−10))*Ccp/Ctl=25*0.005 pF/0.5 pF=0.25V is generated between the pixels selected by hatched lines and the adjacent pixels not selected by hatched lines. Therefore, the actual voltage written into the affected pixels becomes 2.5−0.25V=2.25V while the voltage written into the pixels unmarked in the figure is still unaffected to be 2.5V.

On the other hand, when the pixel structure receives the frames, as shown in FIG. 4B, the driving method according to one embodiment of the invention sequentially drives the scan lines G2, G4, G6, . . . , G2n. Thus, each pixel of the odd-th data line S(2n−1) and the even-th data line S(2n) will be affected by coupling with the next scan line. For example, in FIG. 4D, when the scan lines G2, G4, G6 are driven sequentially, the pixels P21, P41, P23, and P33 of the odd-th data lines S1 and S3 will be affected and the pixels P12, P32, P41, and P34 of the even-th data lines S2 and S4 will also be affected. In one embodiment, when the scanning voltages (voltages of G2, G4, G6, . . . ) vary, for example, from the high level +15V dropped to −10V, the coupling voltage ΔV=(15−(−10))*Ccp/Ctl=25*0.005 pF/0.5 pF=0.25V is generated between the pixels selected by hatched lines in FIG. 4D. Therefore, the actual voltage written into the affected pixels becomes 2.5−0.25V=2.25V while the voltage written into the pixels unmarked in the figure is still unaffected to be 2.5V.

Thus, at different time points, the affected pixels in FIGS. 4C and 4D are complementary and the visual integrated effect shown by the pixel structure is the voltage difference (2.5+2.25)/2=2.375V written by the each data line. Therefore, there is a 0.125V voltage drop in whole frame. Thus, the designer only needs to decrease the voltage of the common electrode Vcom by 0.125V. Then, the whole frame can have a 2.5V voltage difference and thereby there is no any visual difference. Therefore, the problem in the prior art is thus solved.

Figure 5A:
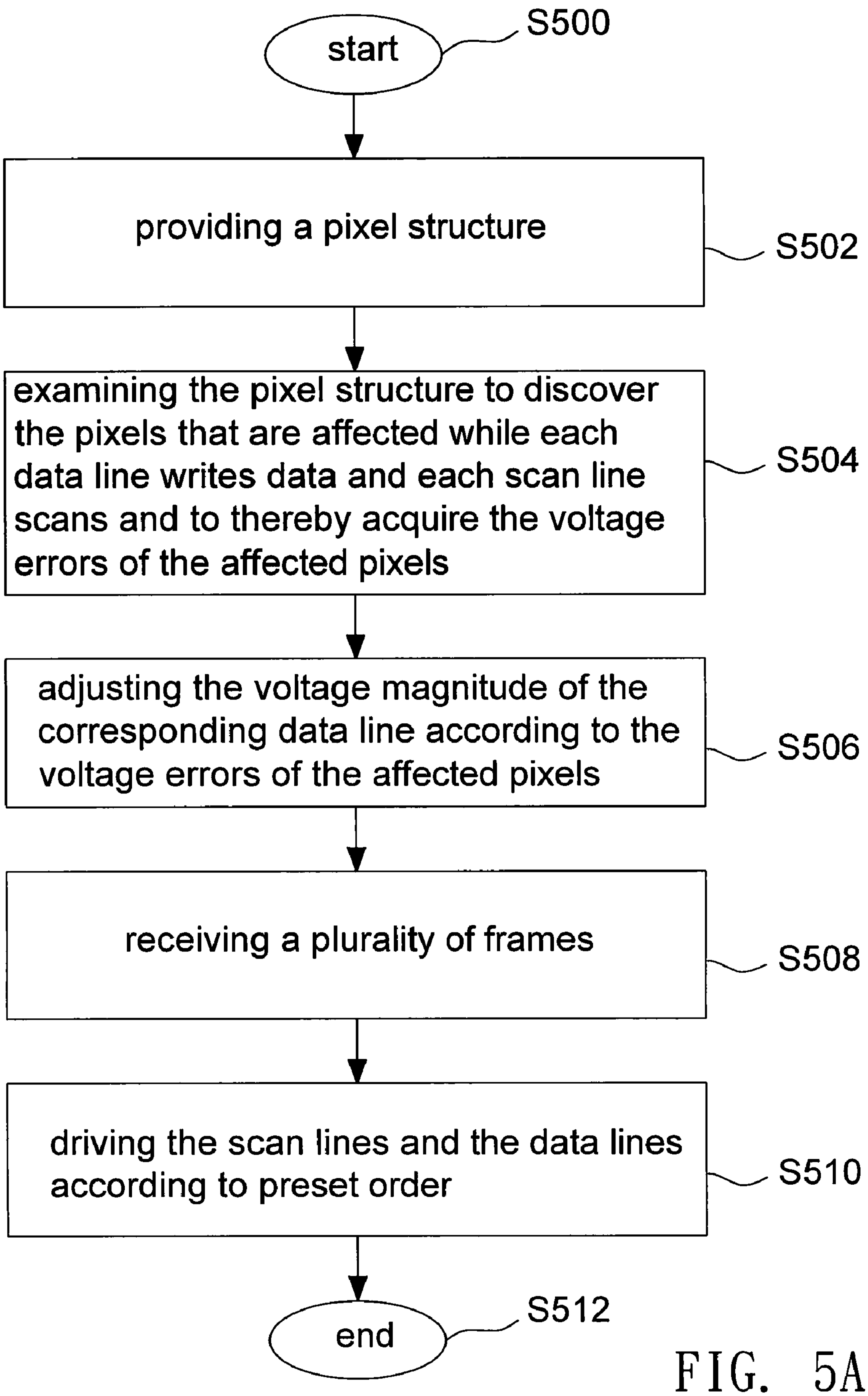
FIG. 5A shows a flow chart diagram illustrating the driving method for a display according to another embodiment of the invention.
Figure 5B:
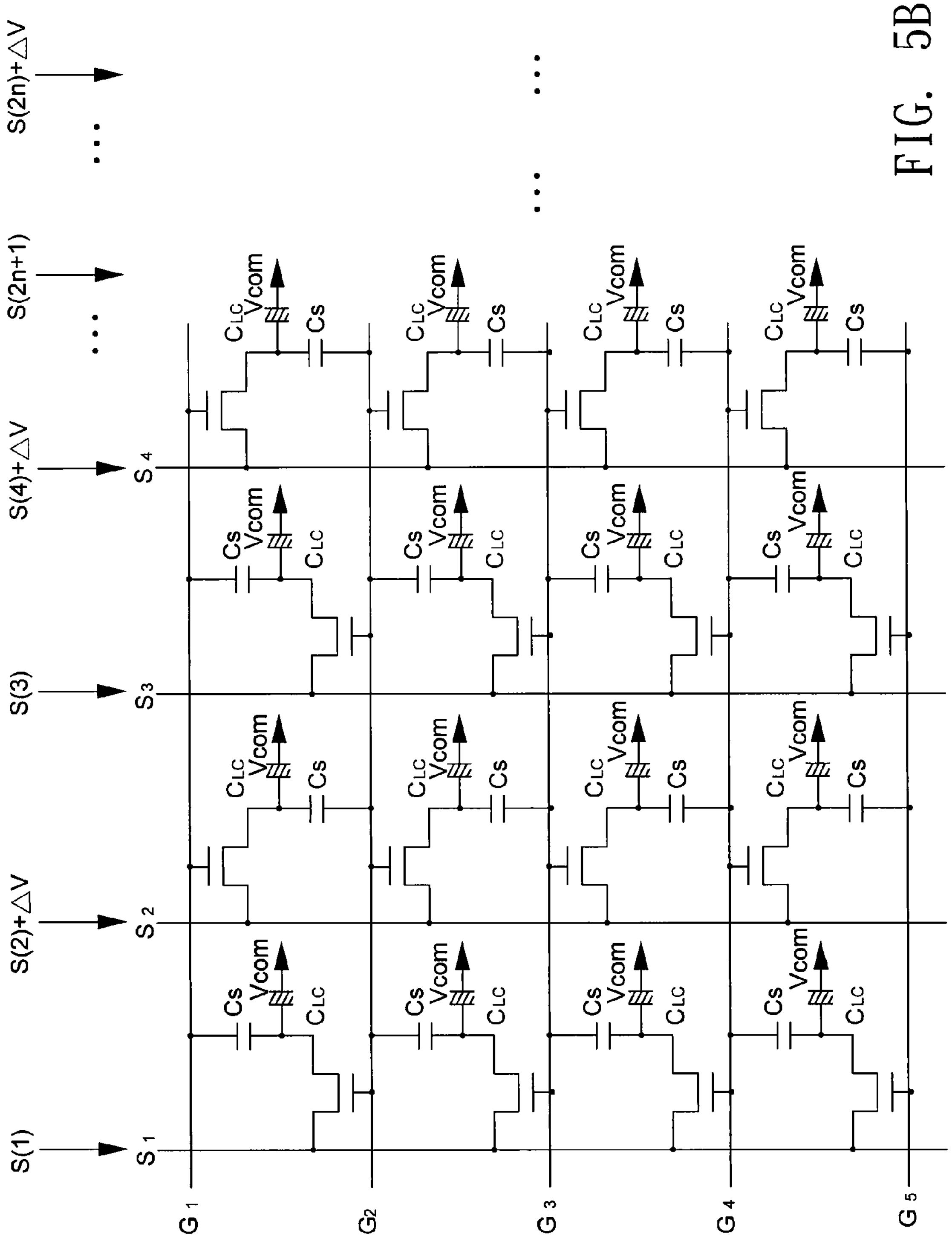
FIG. 5B shows one operational schematic diagram of the driving method shown in FIG. 5A.

FIG. 5A shows a flow chart diagram illustrating the driving method for a display according to another embodiment of the invention. FIG. 5B shows a schematic diagram illustrating the voltage distribution of the driving method for a display in FIG. 5A. The pixel structure of FIG. 5B is the same as that of FIGS. 3C, 3D, 4C and 4D and will not be described in details hereafter.

As shown in FIG. 5A, the driving method for a display comprises the following steps:

Step S500: start;

Step S502: at first, providing a pixel structure as shown in FIG. 5B where the pixel structure comprises a plurality of scan lines, a plurality of data lines, and a plurality of pixels and the gate electrodes of the adjacent pixels couple to different scan lines;

Step S504: examining the pixel structure to discover the pixels that are affected while each data line writes data and each scan line scans and to thereby acquire the voltage errors of the affected pixels;

Step S506: adjusting the voltage magnitude of the corresponding data line according to the voltage errors of the affected pixels where in one example, adjusting the voltage magnitude of the corresponding data line can be implemented by a driver chip (circuit) having two sets of Gamma curves or in another example, adjusting the voltage magnitude of the corresponding data line can be implemented by presetting a voltage by a driver chip (circuit) and adding this voltage to the needed data line;

Step S508: receiving a plurality of frames;

Step S510: driving the scan lines and the data lines according to preset order where the preset order is sequentially driving from the first scan line to the n-th scan line or sequentially driving from the first data line to the n-th data line (n is a positive integer and less than infinity); and Step S512: End.

The following example will describe the driving method for a display in details, with reference to FIGS. 5A and 5B.

For the pixel structure shown in FIG. 5B, it is assumed that the frame of the display is set to have a 2.5V voltage difference by the designer. In addition, according to the characteristics of the pixel structure (that can be realized in the description of the prior art), the characteristics of the pixel structure can be examined and the pixels that are affected while each data line writes data and each scan line scans can be distinguished. For example, after examining the pixel structure in FIG. 5B, the pixel of the even-th data line S(2n) will couple with the next scan line. As the voltage of the next scan line varies, the pixel of the even-th data line S(2n) will be affected. In one embodiment, as the scanning voltage of the pixel drops from the high level +15V to the low level −10V, the coupling voltage ΔV=(15−(−10))*Ccp/Ctl=25*0.005 pF/0.5 pF=0.25V between the pixels of the even-th data line is generated. This coupling voltage makes the voltage which is to be written into the pixel of each even-th data line S(2n) be decreased by 0.25V. Therefore, according to this voltage error, when the driver chip (IC) drives the even-th data line S(2n), the driving voltage of each even-th data line S(2n) is increased to be 2.5+0.25=2.75V. Thus, the actual writing voltage of the even-th data line S(2n) is equal to the preset value 2.75−0.25=2.5V. Since the odd-th data line S(2n+1) will not be affected by the next scan line, the writing voltage is equal to 2.5V. Therefore, the writing voltage for the whole frame is 2.5V and the display quality can be enhanced. Thus, the problem in the prior art is solved.

Figure 6A:
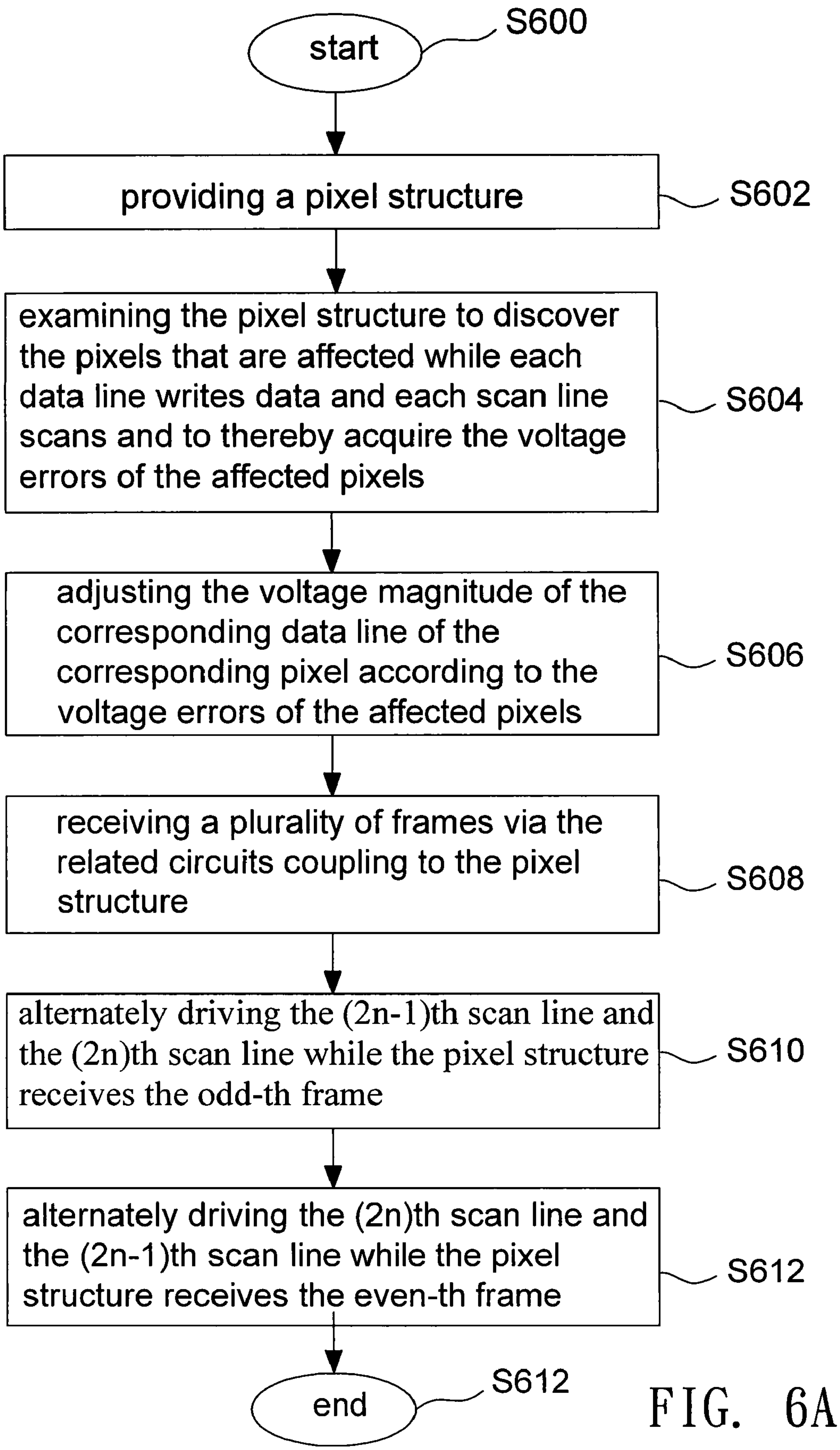
FIG. 6A shows a flow chart diagram illustrating the driving method for a display according to another embodiment of the invention.

It should be noted that the driving method in FIG. 3A can be cooperated to the driving method in FIG. 5A to derive another driving method for a display. This driving method for a display is shown in FIG. 6A and comprises the following steps:

Step S600: start;

Step S602: at first, providing a pixel structure where the pixel structure comprises a plurality of scan lines, a plurality of data lines, and a plurality of pixels;

Step S604: examining the pixel structure to discover the pixels that are affected while each data line writes data and each scan line scans and to thereby acquire the voltage errors of the affected pixels;

Step S606: adjusting the voltage magnitude of the corresponding data line of the corresponding pixel according to the voltage errors of the affected pixels;

Step S608: receiving a plurality of frames via the related circuits coupling to the pixel structure.

Step S610: alternately driving the (2n−1)th scan line and the (2n)th scan line while the pixel structure receives the odd-th frame where n is a positive integer and less than infinity;

Step S612: alternately driving the (2n)th scan line and the (2n−1)th scan line while the pixel structure receives the even-th frame; and Step S614: End.

The following example describes the driving method for a display according to one embodiment of the invention.

Figure 6B:
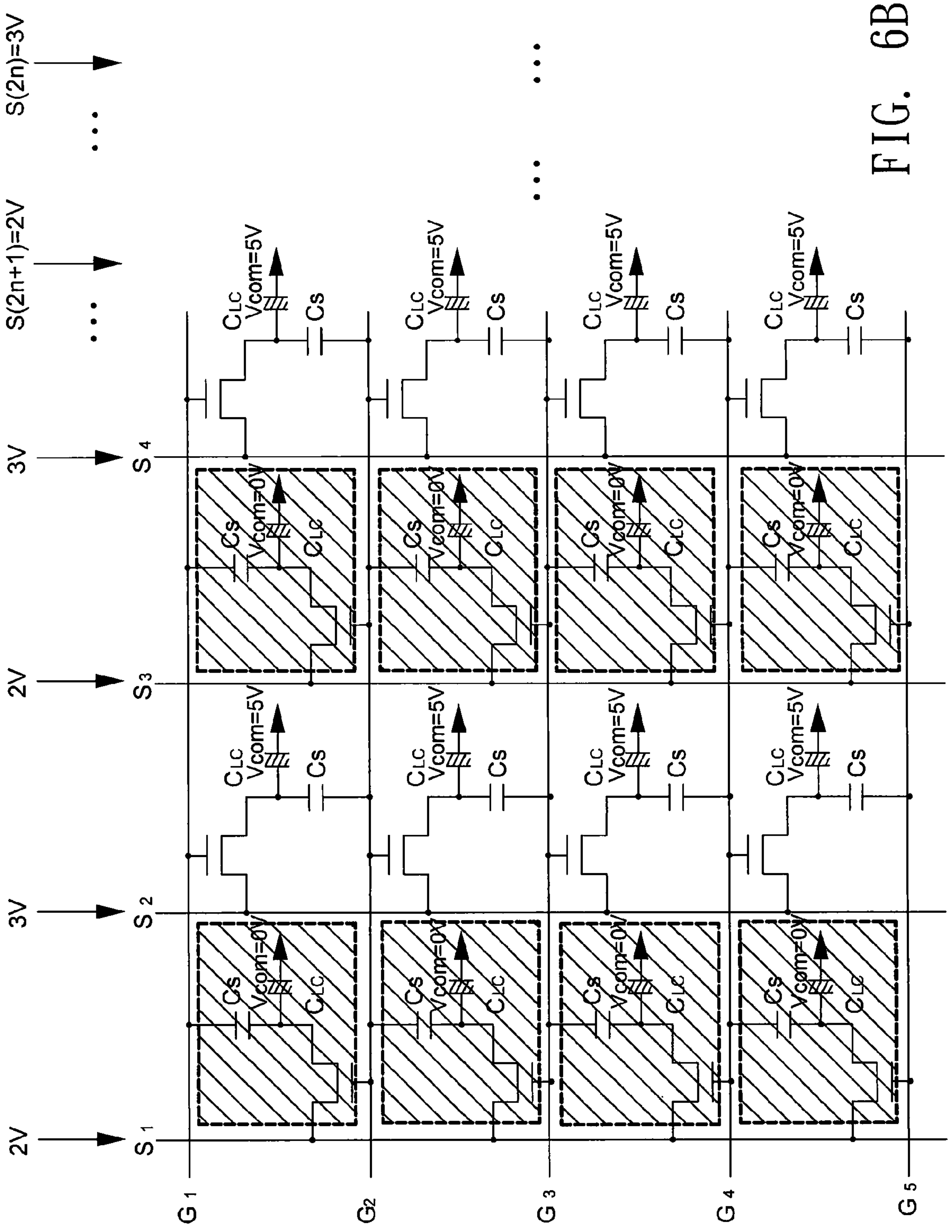
FIG. 6B shows one operational schematic diagram of the driving method shown in FIG. 6A.
Figure 6C:
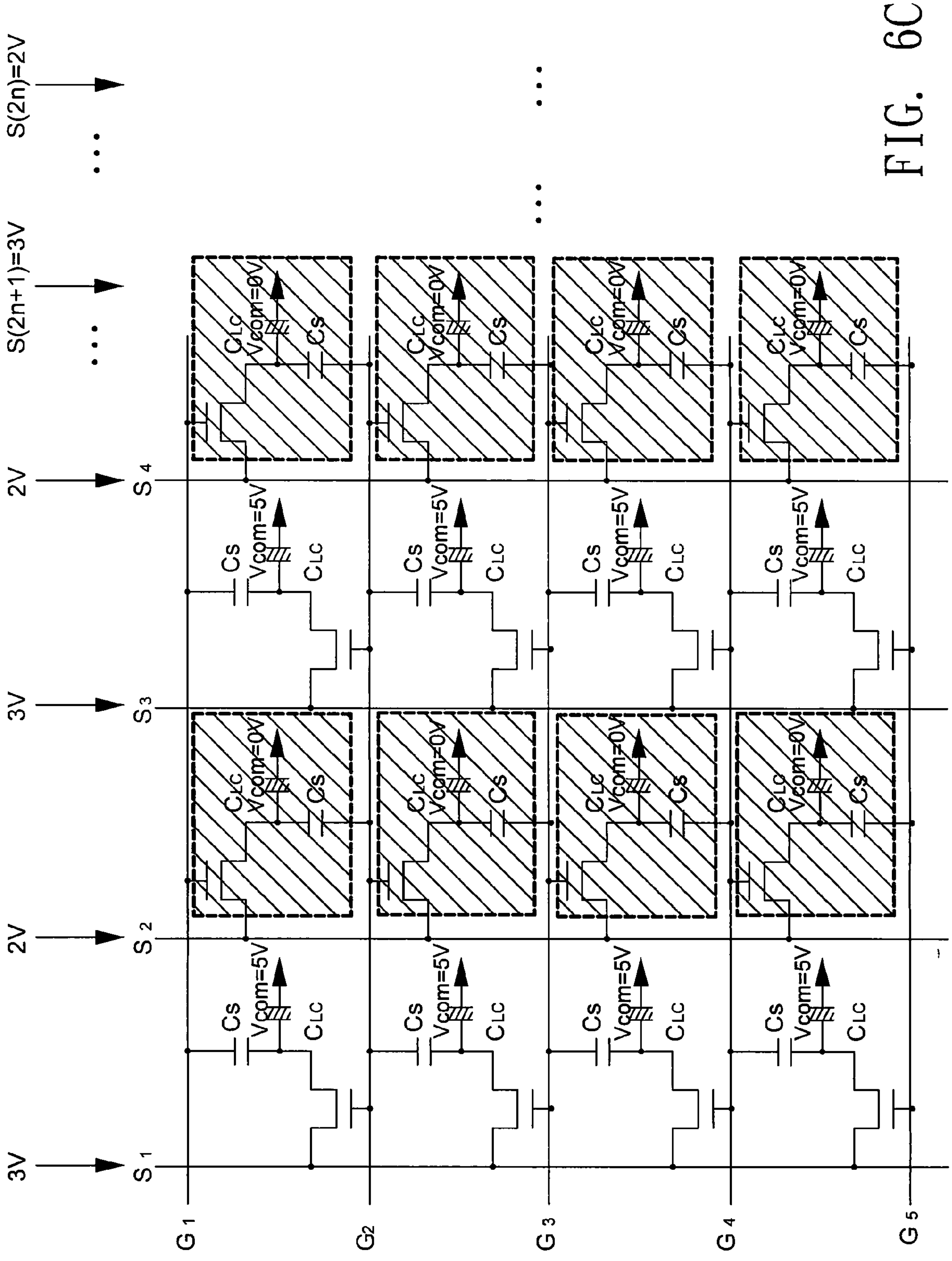
FIG. 6C shows another operational schematic diagram of the driving method shown in FIG. 6A.

Referring to FIGS. 6A, 6B, and 6C, it is assumed that the designer wants to fill the whole frame with a 2V voltage difference. As shown in FIGS. 6A and 6B, when the pixel structure receives the odd-th frame, the scan lines G1, G2, G3, . . . , G2n−1, G2n are sequentially scanning, together with the empirical value known by examining the pixel structure of FIGS. 6B and 6C, and at the scanning time of the data line, the voltage of the odd-th data line S(2n−1) is set to be input 2V and the voltage of the common electrode Vcom is set to 0V while the voltage of the even-th data line S(2n) is set to be input 3V and the voltage of the common electrode Vcom is set to 5V. Since the odd-th data line S(2n−1) will be input first, the pixel of the odd-th data line S(2n−1) will have the coupling voltage ΔV=(3−2)*Ccp/Ctl=1*0.05 pF/0.5 pF=0.1V due to the effect of the data line being increased from 2V to 3V. Thus, the actual writing voltage of the odd-th data line S(2n−1) is 2+0.1V while that of the even-th data line S(2n) is not affected and is 3V. Therefore, the voltage difference written into the pixel of the odd-th data line S(2n−1) is 2.1−0=+2.1V while the voltage difference written into the pixel of the even-th data line S(2n) is 3−5=−2V.

After that, as shown in FIGS. 6A and 6C, when the pixel structure receives the even-th frame, the scan lines G2, G1, G4, G3, . . . , G2n, G2n−1 are sequentially scanning, together with the empirical value known by examining the pixel structure of FIGS. 6B and 6C, and at the scanning time of the data line, the voltage of the odd-th data line S(2n−1) is set to be input 3V and the voltage of the common electrode Vcom=5V while the voltage of the even-th data line S(2n) is set to be input 2V and the voltage of the common electrode Vcom=0V. Since the even-th data line S(2n−1) will be input first, the pixel of the even-th data line S(2n) will have the coupling voltage ΔV=(3−2)*Ccp/Ctl=1*0.05 pF/0.5 pF=0.1V due to the effect of the data line being increased from 2V to 3V. Thus, the actual writing voltage of the even-th data line S(2n) is 2+0.1V while that of the odd-th data line S(2n−1) is not affected and is 3V. Therefore, the voltage difference written into the pixel of the even-th data line S(2n) is 2.1−0=+2.1V while the voltage difference written into the pixel of the odd-th data line S(2n−1) is 3−5=−2V.

Thus, the visual integrated effect shown by the pixel structure is the voltage difference ((|−2V|+|2.1V|)/2)=2.05V written by the even-th data line S(2n) and the voltage difference ((|2.1V|+|−2V|)/2)=2.05V written by the odd-th data line S(2n−1). The user will not tell any visual difference between writing data by the even-th data line S(2n) and the odd-th data line S(2n−1). The display quality is thereby improved and the problem in the prior art is solved.

| Odd-the frame | | Even-th frame | |
|---|---|---|---|
| S(2n) | S(2n + 1) | S(2n) | S(2n + 1) |
| −2 V | +2.1 V | +2.1 V | −2 V |

Figure 7:
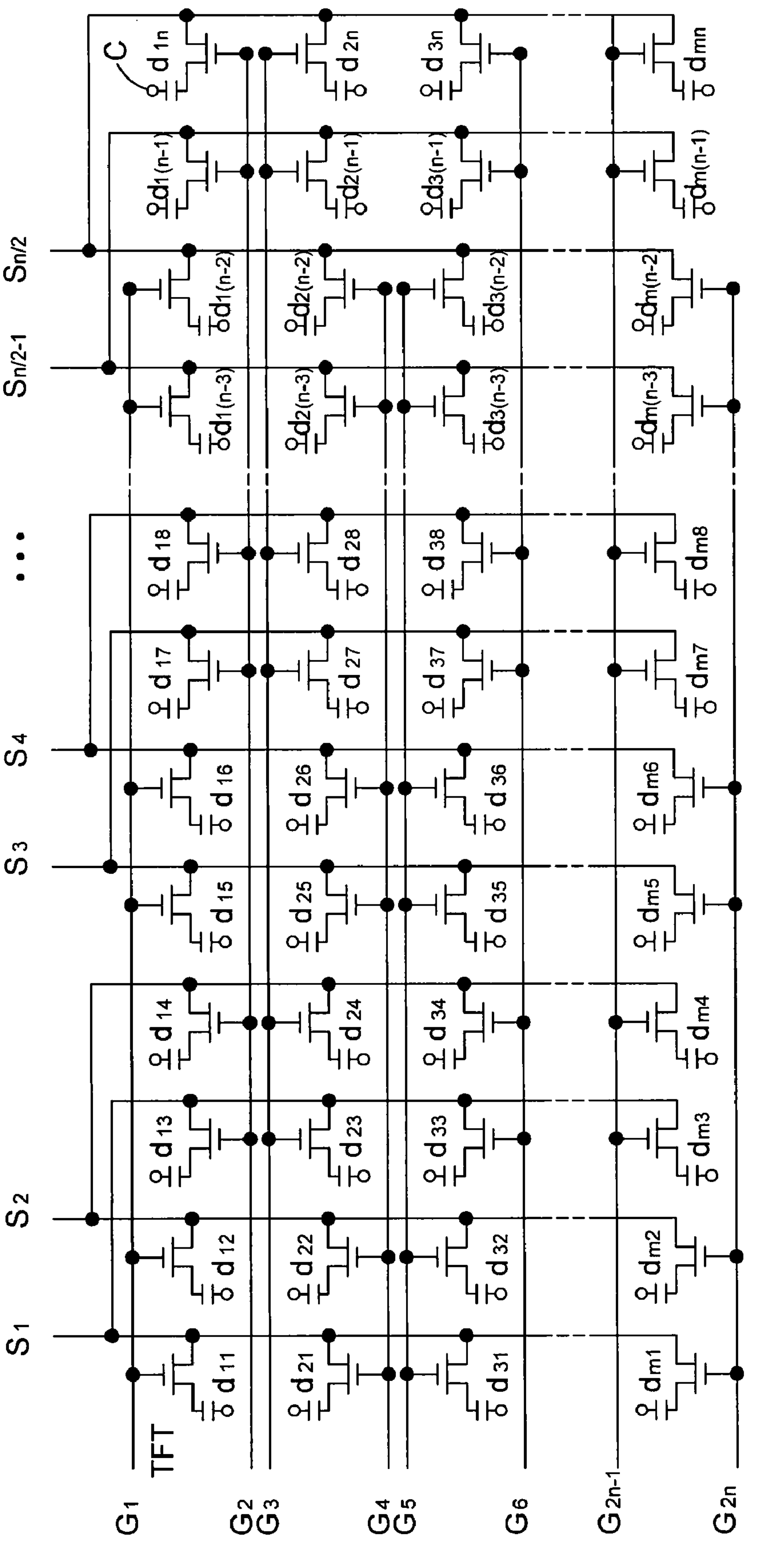
FIG. 7 shows a schematic diagram illustrating an example of the pixel structure applied in one embodiment of the invention.
Figure 8:
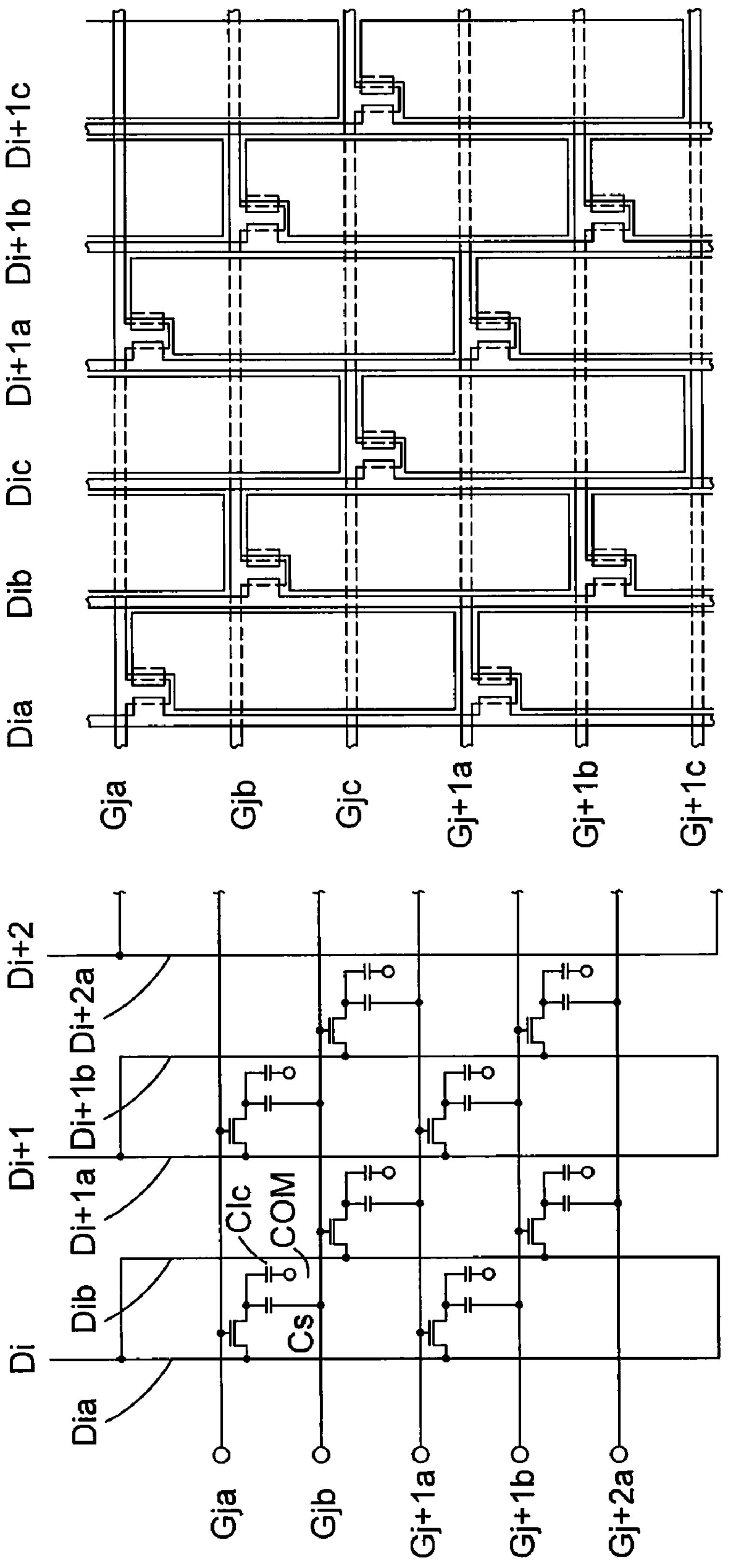
FIG. 8 shows a schematic diagram illustrating another example of the pixel structure applied in one embodiment of the invention.

It should be noted that the driving method for a display of the above embodiment can be applied to the pixel structure shown in FIGS. 1A, 3C, 3D, 4C, 4D, 5B, 6B, and 6C and also to the current or future pixel structure. For example, the driving method can be applied to the pixel structure shown in FIGS. 2, 7, and 8 and those who are skilled in the art will understand how to implement according to the above description. In the pixel structure shown in FIG. 7, every two adjacent pixels of each row are a set of pixels, the gate electrodes of the same set of pixels couple to the same scan line and the gate electrodes of the adjacent two sets of pixels couple to different scan lines. In other words, every four adjacent pixels of each row in the pixel structure are defined as two set of pixels. The gate electrodes of one set of pixels connect to the same scan line and the gate electrodes of the other adjacent set of pixels connect to another different scan line. In the pixel structure shown in FIG. 8, the gate electrodes of the adjacent pixels of the same row couple to different scan lines.

Figure 1A:
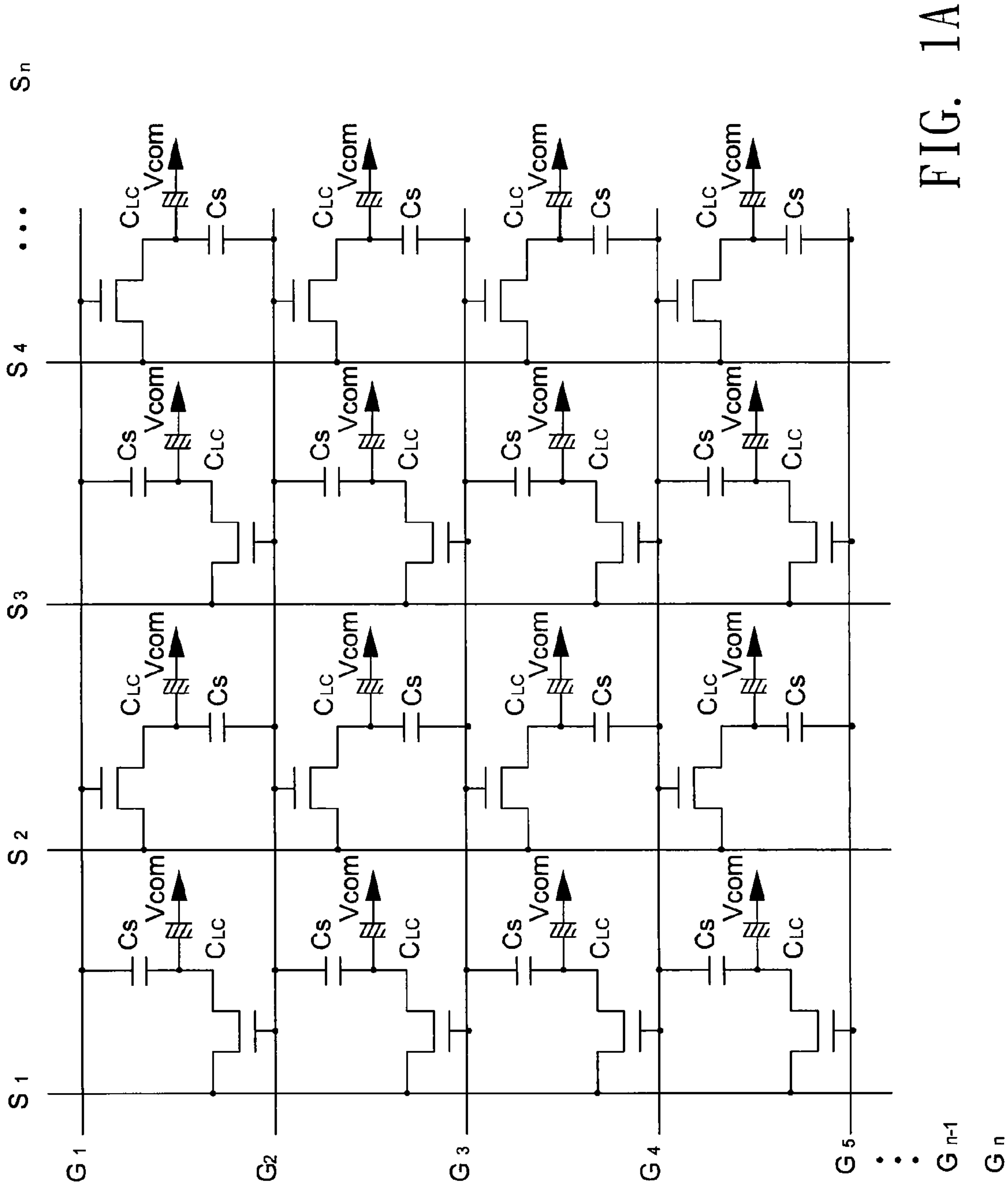
FIG. 1A shows a schematic diagram illustrating a pixel structure in the prior art.
Figure 1B:
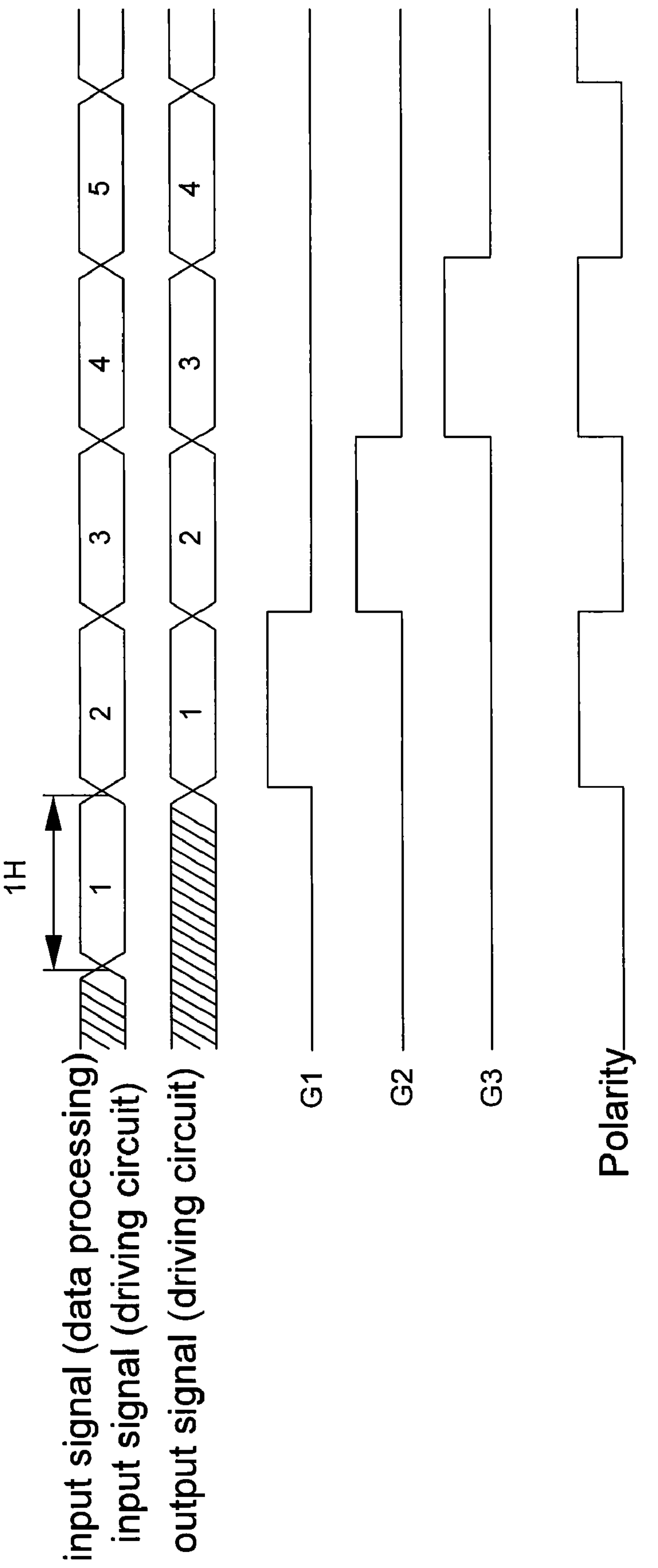
FIG. 1B shows a schematic diagram illustrating the waveforms for driving the pixel structure in FIG. 1A in the prior art.
Figure 2:
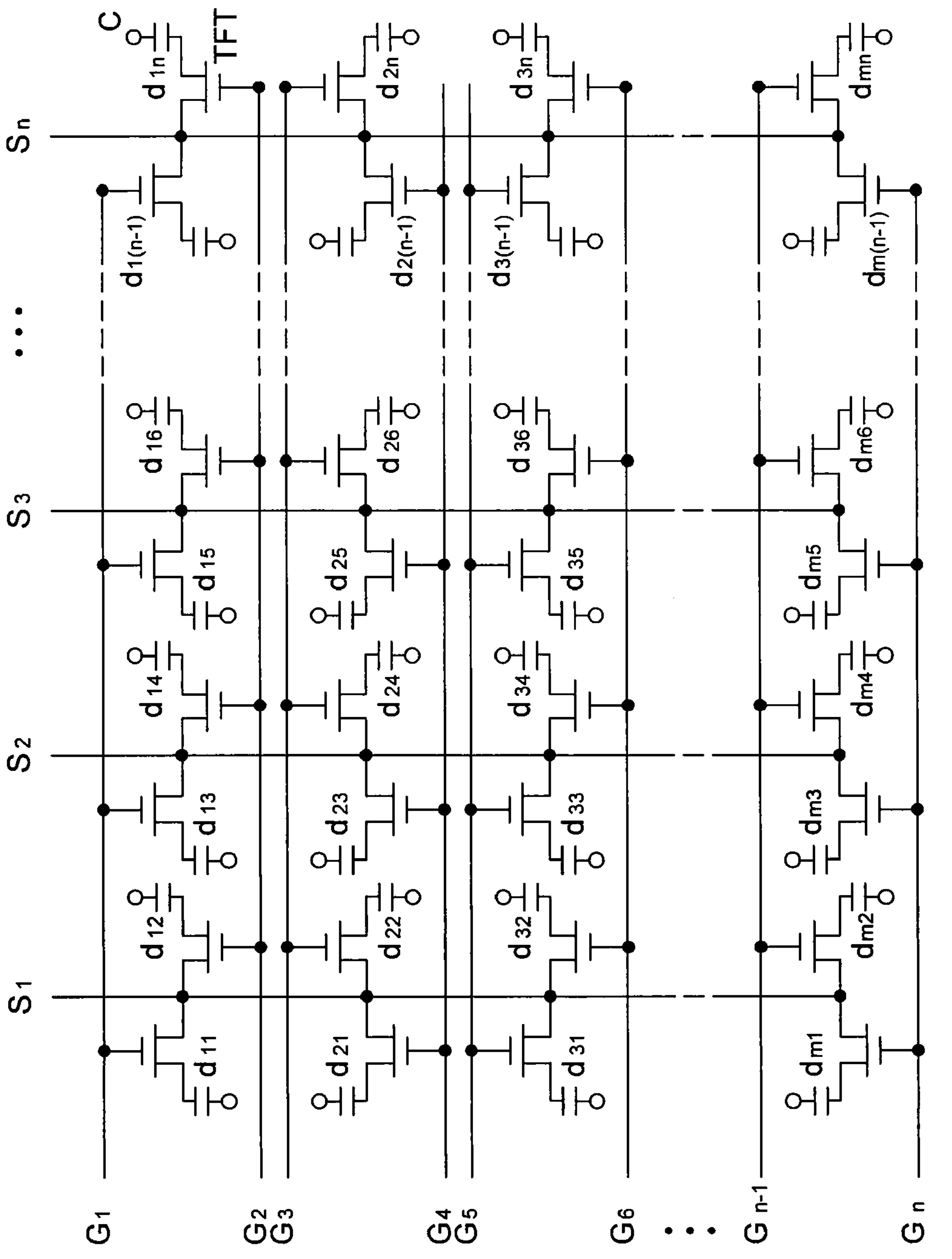
FIG. 2 shows a schematic diagram illustrating another pixel structure in the prior art.

For example, as the driving method for a display shown in FIGS. 3A and 3B is applied to FIG. 2, the order of scan lines for the odd-th frame is G1, G2, G3, . . . , G2n−1, G2n. The data of the same column drives the even-th data line S(2n) first and then drives the odd-th data line S(2n−1) where the data written by the even-th data line S(2n) will be affected by voltage coupling while the following odd-th data line S(2n−1) writes. On the other hand, the order of scan lines for the even-th frame is G2, G1, G4, G3, . . . , G2n, G2n−1 and the data of the same column drives the odd-th data line S(2n−1) first and then drives the even-th data line S(2n) where the data written by the odd-th data line S(2n−1) will be affected by voltage coupling while the following even-th data line S(2n) writes. Therefore, the total display result is that the pixel of the even-th data line S(2n) of the odd-th frame is affected by coupling and the pixel of the odd-th data line S(2n−1) of the even-th frame is affected by coupling. As a whole, through the visual integrated effect, all the pixels seem to be affected and thus no difference is distinguished. Therefore, the display quality is improved and the problem in the prior art is solved.

The driving method for a display according to the embodiments of the invention properly drives the pixels of different positions at different time points to distribute the effect caused by the characteristics of the pixel structure evenly among all the pixels and, according to the error reference value acquired from the effect, adjusts the voltage of the common point to compensate the error so as to achieve the purpose of having all the pixels display uniformly and enhancing display quality.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A driving method for a display, the method comprising:

providing a pixel structure that comprises a plurality of scan lines, a plurality of data lines, and a plurality of pixels;

receiving a plurality of frames;

alternately driving the (2n−1)th scan line and the (2n)th scan line while receiving the odd-th frame wherein n is a positive integer and less than infinity, wherein the $1^{st}$ scan line is driven first and the $2^{nd}$ scan line is driven later during the odd-th frame;

alternately driving (2n)th scan line and (2n−1)th scan line while receiving the even-th frame wherein the $2^{nd}$ scan line is driven first and the $1^{st}$ scan line is driven later during the even-th frame; and adjusting the voltage of the common electrode Vcom according to the voltage values which are to be written into the pixels separately by odd data lines and even data lines while the pixel structure receives the odd-th frame and the even-th frame.

2. The method according to claim 1, wherein the gate electrodes of every two adjacent pixels in the pixel structure connect to different scan lines.

3. The method according to claim 1, wherein every four adjacent pixels of each row in the pixel structure are defined as two set of pixels, the gate electrodes of one set of pixels connect to the same scan line and the gate electrodes of the other adjacent set of pixels connect to different scan line.

4. A driving method for a display, the method comprising:

providing a pixel structure that comprises a plurality of scan lines, a plurality of data lines, and a plurality of pixels;

receiving a plurality of frames wherein the time period of everyone of the frames is divided into a first duration and a second duration;

driving the odd-th scan lines while receiving frames during the first duration;

driving the even-th scan lines while receiving frames during the second duration; and adjusting the voltage of the common electrode Vcom according to the voltage values which are to be written into the pixels separately by odd data lines and even data lines while the pixel structure receives the odd-th frame and the even-th frame.

5. The method according to claim 4, wherein the gate electrodes of the adjacent pixels in the pixel structure connect to different scan lines.

6. The method according to claim 4, wherein every two adjacent pixels of each row in the pixel structure are a set of pixels, the gate electrodes of the same set of pixels connect to the same scan line and the gate electrodes of the adjacent two sets of pixels connect to different scan lines.

7. The method according to claim 4, wherein the gate electrodes of the adjacent pixels of the same row connect to the same scan line.

8. The method according to claim 4, wherein driving the odd-th scan lines is carried out by sequentially driving the (2n−1)-th scan line where n is a positive integer and the numbering of the scan line is increased progressively until reaching n that is less than infinity.

9. The method according to claim 4, wherein driving the even-th scan lines is carried out by sequentially driving the (2n)-th scan line where n is a positive integer and the numbering of the scan line is increased progressively until reaching n that is less than infinity.

10. The method according to claim 4, wherein driving the odd-th scan lines is carried out by sequentially driving the (2n−1)-th scan line where n is a positive integer and less than infinity, and the numbering of the scan line is decreased progressively from n until n=1.

11. The method according to claim 4, wherein driving the even-th scan lines is carried out by sequentially driving the (2n)-th scan line where n is a positive integer and less than infinity, and the numbering of the scan line is decreased progressively from n until n=1.

12. The method according to claim 4, wherein the odd-th scan lines are driven in preset order.

13. The method according to claim 4, wherein the even-th scan lines are driven in preset order.

14. A driving method for a display, the method comprising:

providing a pixel structure that comprises a plurality of scan lines, a plurality of data lines, and a plurality of pixels;

examining the pixel structure to discover the pixels that are affected while each data line writes data and each scan line scans and to thereby acquire the voltage errors of the affected pixels;

adjusting the voltage magnitude of the corresponding data line according to the voltage errors of the affected pixels;

receiving a plurality of frames; and driving the scan lines and the data lines according to preset order.

15. The method according to claim 14, further comprising: alternately driving the (2n−1)th scan line and the (2n)th scan line while receiving the odd-th frame wherein n is a positive integer and less than infinity.

16. The method according to claim 15, wherein the data lines from the start data line to the n-th data line are sequentially driven while the pixel structure receives the odd-th frame where n is a positive integer and less than infinity.

17. The method according to claim 15, further comprising: alternately driving the (2n)th scan line and the (2n−1)th scan line while receiving the even-th frame wherein n is a positive integer and less than infinity.

18. The method according to claim 17, wherein the data lines from the start data line to the n-th data line are sequentially driven while the pixel structure receives the even-th frame where n is a positive integer and less than infinity.

19. The method according to claim 14, wherein the gate electrodes of the adjacent pixels in the pixel structure connect to different scan lines.

20. The method according to claim 14, wherein every two adjacent pixels of each row in the pixel structure are a set of pixels, the gate electrodes of the same set of pixels connect to the same scan line and the gate electrodes of the adjacent two sets of pixels connect to different scan lines.

21. The method according to claim 14, wherein the gate electrodes of the adjacent pixels of the same row connect to the same scan line.

22. The method according to claim 14, wherein the scan lines and the data lines are sequentially driven.

* * * * *